United States Patent [19]

Hansel

[11] Patent Number: 5,524,432

[45] Date of Patent: Jun. 11, 1996

[54] CATALYTIC REDUCTION OF NITROGEN OXIDES IN METHANE-FUELED ENGINE EXHAUST BY CONTROLLED METHANE INJECTIONS

[75] Inventor: James G. Hansel, Emmaus, Pa.

[73] Assignee: Air Products and Chemicals, Inc., Allentown, Pa.

[21] Appl. No.: 330,158

[22] Filed: Oct. 27, 1994

Related U.S. Application Data

[63] Continuation-in-part of Ser. No. 982,200, Nov. 25, 1992, Pat. No. 5,451,385, which is a continuation-in-part of Ser. No. 929,619, Aug. 13, 1992, Pat. No. 5,260,043, which is a continuation-in-part of Ser. No. 739,273, Aug. 1, 1991, Pat. No. 5,149,512.

[51] Int. Cl.$^6$ ................................ F01N 3/18; F01N 3/36
[52] U.S. Cl. ................................ 60/274; 60/276; 60/285; 60/286; 60/298; 60/301
[58] Field of Search ............................ 60/274, 276, 285, 60/286, 298, 301

[56] References Cited

U.S. PATENT DOCUMENTS 5,131,224   7/1992   Siewert et al. ............................ 60/274

FOREIGN PATENT DOCUMENTS

468556A1   6/1991   European Pat. Off. .

OTHER PUBLICATIONS

Burns, K. R. et al. "Catalytic Control of NOx Emissions From Stationary Rich–Burning Natural Gas Engines." *ASME Paper* 83-DGP-12.

Fowler, T. et al. "Reduced NOx Emissions from Internal Combustion Engines Fuelled by Natural Gas." *Fuel* Apr. 1991: 499–502.

Summers, J. C. et al. "Control of NOx/CO/HC Emissions from Natural Gas Fueled Stationary Engines with Three-Way Catalysts." Presented at 84th Annual Meeting and Exhibition, Air & Waste Management Association. 16–21 Jun. 1991. Vancouver, British Columbia.

Castaldini, C. et al. "Environmental Assessment of Catalytic Reduction of Natural Gas–Fired Engines". *Proc. Sympos. Combustion NOx Control* 1985, vol. 2, pp. 57/1–57/16, 1987.

Nagalingam, B. et al. "Performance Study Using Natural Gas, Hydrogen–Supplemented Natural Gas and Hydrogen in AVL Research Engine." *Int. J. Hydrogen Energy*, vol. 8, No. 9, pp. 715–720, 1983.

Hurn, R. W. "Methane/Hydrogen Mixture As A Fuel for Spark–Ignition Engines." *Proc. Conf. Natural Gas Res. Tech.*, 2nd, 1972, VI 4, pp. 1–8.

Kosstrin, M. et al. "The Combustion of MSW–Derived Low–Btu Gas In An Internal Combustion Engine." *Energy Biomass Wastes*, 1988, vol. 11, pp. 217–236.

Wong, J. K. S. "Study of Mixtures of Methane and Carbon Dioxide as Fuels in a Single Cylinder Engine (CLR)." *Mech. Eng. Report–Nat'l. Res. Council Canada*, MP, MP-70, 27 pp., 1976.

Stolz, J. L. "Operating A Diesel Locomotive with Liquid Methane Fuel." *ASME Energy Source Technology Conf. and Expo.* 26–30 Jan. 1992. Houston, TX.

Primary Examiner—Douglas Hart
Attorney, Agent, or Firm—John M. Fernbacher

[57]   ABSTRACT

Nitrogen oxides are removed from the exhaust of an internal combustion engine which operates on a methane-containing fuel by reacting the nitrogen oxides and oxygen in the exhaust gas with a controlled amount of methane in the presence of a reducing catalyst. The catalyst preferably comprises a crystalline zeolite having a silicon to aluminum ratio of equal to or greater than about 2.5 which is prepared from a non-acid zeolite which is ion exchanged with a cation selected from the group consisting of cobalt, nickel, iron, chromium, and manganese. Methane for the reaction is provided as a portion of the methane-containing fuel. Carbon monoxide present in the exhaust gas is converted to carbon dioxide simultaneously with the reduction of nitrogen oxides.

24 Claims, 5 Drawing Sheets

CATALYTIC REDUCTION OF NITROGEN OXIDES IN METHANE-FUELED ENGINE EXHAUST BY CONTROLLED METHANE INJECTIONS

This application is a continuation-in-part of Ser. No. 07/982,200 filed Nov. 25, 1992, now U.S. Pat. No. 5,451,385, which is a continuation-in-part of Ser. No. 07/929,619 filed Aug. 13, 1992, now U.S. Pat. No. 5,260,043 issued Nov. 9, 1993, which is a continuation-in-part of Ser. No. 07/739,273 filed Aug. 1, 1991, now U.S. Pat. No. 5,149,512 issued Sep. 22, 1992, all specifications of which are incorporated herein by reference.

FIELD OF THE INVENTION

The present invention relates to the control of emissions from internal combustion engines, and in particular to the control of nitrogen oxide and carbon monoxide emissions from methane-fueled internal combustion engines.

BACKGROUND OF THE INVENTION

Methane-fueled internal combustion engines are attractive alternatives to liquid-fueled spark-ignition and compression-ignition (diesel) engines for many applications in which reduced exhaust emissions are required. In addition, economy of operation favors the use of methane-fueled engines in many specific applications. Methane-fueled engines are subject to similar exhaust emission regulations as conventional liquid-fueled engines in both stationary and mobile applications. Such emission requirements include control of carbon monoxide, unburned hydrocarbons, and certain oxides of nitrogen, generally defined as $NO_x$, which in the art typically refers to NO (nitric oxide) and $NO_2$ (nitrogen dioxide). In mobile applications, i.e. cars, trucks, and buses, the most common emission control method for gasoline engines is the well-known three-way catalyst which typically yields a 90% reduction in $NO_x$, CO, and unburned hydrocarbons.

The use of three-way catalysts in natural gas-fueled automotive engines is described in European Patent Application Publication No. 0 468 556 A1. In applications of natural gas-fired stationary engines for power generation, pipeline pumping, compression, and the like, a three-way catalyst can be used as described in several references including "Catalytic Control of $NO_x$ Emissions from Stationary Rich-Burning Natural Gas Engines" by K. R. Burns et al, ASME Paper 83-DGP-12; "Reduced $NO_x$ Emissions from Internal Combustion Engines Fuelled by Natural Gas" by T. Fowler et al in *Fuel*, 1991, Vol. 70, April, pp. 499–502; "Control of $NO_x$/CO/HC Emissions from Natural Gas Fueled Stationary Engines with Three-Way Catalysts" by J. C. Summers et al, presented at the 84th Annual Meeting and Exhibition of the Air and Waste Management Association, Vancouver, B.C., Jun. 16–21, 1991; and U.S. Pat. No. 5,131,224. The removal of $NO_x$ from a rich-burn gas-fired engine by nonselective catalytic reduction by CO and unburned hydrocarbons is described by C. Castaldini et al in an article entitled "Environmental Assessment of Catalytic Reduction of Natural-Gas-Fired Engines" in *Proc. Sympos. Stationary Combustion $NO_x$ Control* 1985, Vol. 2, pp 57/1–57/16, 1987. The article also discusses the use of selective catalytic reduction by ammonia for $NO_x$ control in a lean-burn gas-fired engine.

Methane also is used in combination with other components in fuels for internal combustion engines, and such engines are also defined herein as methane-fueled engines. B. Nagalingam et al describe the use of hydrogen-natural gas mixtures as well as pure hydrogen for stationary engine fuel in an article entitled "Performance Study Using Natural Gas, Hydrogen-Supplemented Natural Gas, and Hydrogen in AVL Research Engine" in *J. Hydrogen Energy*, Vol. 8, No. 9, pp. 715–720, 1983. The use of hydrogen or hydrogen-natural gas mixtures were found to decrease unburned hydrocarbons but increase $NO_x$ in the exhaust gas. R. W. Hurn also describes the use of hydrogen-methane mixtures as fuel for spark-ignition engines in a paper of the same title in Proc. Conf. Natur. Gas Res. Technol., 2nd, 1972, VI 4, pp. 1–8. Low BTU gas comprising methane, hydrogen, and carbon monoxide can be used for engine fuel as reported by H. M. Kosstrin et al in *Energy Biomass Wastes*, 1988, Vol. 11, pp. 217–236 in an article entitled "The Combustion of MSW-Derived Low-BTU Gas in an Internal Combustion Engine". Such gas can be produced by fluid-bed gasification of municipal solid waste (MSW) to yield a product with a typical combustible concentration of 5 vol % methane, 14 vol % carbon monoxide, and 6 vol % hydrogen. This gas after appropriate cleanup was used successfully to operate a gas-fired engine driving an electric generator. Exhaust emissions were controlled by a dual-bed catalytic system in which $NO_x$ was removed in a reducing environment, and CO and unburned hydrocarbons were removed under oxidizing conditions using air injection. Mixtures containing methane and $CO_2$ as fuel for a four-stroke spark-ignition engine were tested and reported by J. K. S. Wong in a paper entitled "Study of Mixtures of Methane and Carbon Dioxide as Fuels in a Single-Cylinder Engine" in Mech. Eng. Report—Natl. Res. Council Canada, MP, MP-70, 27pp., 1976. Such mixtures are obtained from gaseous products of anaerobic biological decomposition such as landfill gas, sewage digester offgas, and the like.

Methane can be used as fuel for a diesel engine wherein a small amount of ordinary liquid diesel fuel is injected into the cylinders with the methane to ensure proper ignition. The operation of such an engine, generally defined as a dual-fuel engine, is described in a paper entitled Operating a Diesel Locomotive With Liquid Methane Fuel" by J. L. Stolz, ASME Energy Source Technology Conference and Exposition, Houston, Tex., Jan. 26–30, 1992. Development work is in progress as well on the operation of diesel engines fueled with methane alone. The use of methane to replace most or all of the liquid diesel fuel reduces particulate emissions, but control of $NO_x$ is still required. Since combustion occurs on the lean side in a diesel engine, the only current practical catalytic method for $NO_x$ control in conventional and dual-fuel diesel engines is selective catalytic reduction with ammonia. While exhaust gas recirculation provides a degree of $NO_x$ reduction, this noncatalytic method cannot meet the low emission requirements anticipated in the future.

Currently practiced catalytic $NO_x$ removal methods for emission control in methane-fueled internal combustion engines have several drawbacks. First, the use of the three-way catalyst is effective only when the engine is operated at carefully-controlled air/fuel ratios, generally slightly fuel-rich and in a very narrow operating window, so that the three-way catalyst is not applicable to highly efficient lean-burn engines which utilize compression-ignition (diesel) or spark-ignition cycles. Such lean-burn engines, which exhibit significantly lower fuel consumption, generally cannot achieve low $NO_x$ emissions by catalytic methods except for selective catalytic reduction by ammonia. Second, three-way catalysts cannot control both CO and $NO_x$ at very low levels simultaneously, since the CO and $NO_x$ react over the catalyst resulting in a tradeoff in control of these two combustion products. Third, in order to achieve very low $NO_x$ levels by reduction with ammonia, a large excess of ammonia is required which increases the discharge of ammonia in the treated exhaust. In addition, ammonia is a hazardous material which requires careful handling, and is impractical in mobile applications.

Emission regulations for both mobile and stationary internal combustion engines will become more stringent in coming years. Methane-fueled engines will be increasingly attractive for their favorable emission characteristics as well as economy of operation, and improved methods for more stringent control of $NO_x$ emissions from these engines will be required. Lean-burn engines will be favored in applications where fuel efficiency is important, but simultaneous control of carbon monoxide and $NO_x$ in a single catalyst system is not possible given the current state of the art in lean-burn engine emission control. The present invention disclosed in the following specification and defined in the appended claims offers a novel and useful method for the control of $NO_x$ and carbon monoxide emissions from methane-fueled engines, especially lean-burn engines, by means of a single catalyst system.

SUMMARY OF THE INVENTION

The invention is a method for controlling the reduction of nitrogen oxides in an exhaust gas from a methane-fueled internal combustion engine which contains oxygen, methane, and nitrogen oxides. The method comprises selecting a catalyst capable of reducing nitrogen oxides with methane in the presence of oxygen in the exhaust gas, and determining the reaction characteristics of the catalyst including the degree of nitrogen oxide reduction as a function of temperature and as a function of the molar ratio of methane to nitrogen oxides in the exhaust gas. The operating characteristics of the methane-fueled internal combustion engine are determined, including the concentration of nitrogen oxides in the exhaust gas and the volumetric flow rate of the exhaust gas as functions of selected operating variables comprising one or more engine variables selected from the group consisting of inlet air mass flow, manifold pressure, engine speed, and throttle position. A required degree of nitrogen oxides reduction in the exhaust gas is selected. Using the information on the reaction characteristics of the catalyst, a required temperature range and a required molar ratio of methane to nitrogen oxides in the exhaust gas are determined to achieve the required degree of nitrogen oxides reduction.

A methane-containing fuel is provided and the methane-fueled internal combustion engine is operated utilizing at least a portion of the methane-containing fuel. The temperature of the exhaust gas is controlled within the required temperature range, and selected operating variables comprising one or more engine variables selected from inlet air mass flow, manifold pressure, engine speed, and throttle position are measured. The measured values of these engine variables are utilized with the previously-determined engine operating characteristics to predict the molar flow rate of nitrogen oxides in the exhaust gas.

The predicted molar flow rate of nitrogen oxides and the required molar ratio of methane to nitrogen oxides in the exhaust gas are used to determine the minimum required molar flow rate of methane in the exhaust gas to achieve the required degree of nitrogen oxides reduction. The concentration of unburned methane in the exhaust gas is measured, and the actual molar flow rate of unburned methane is determined. Then, if (1) the actual molar flow rate of methane is less than the minimum required molar flow rate of methane, an additional flow of methane is introduced into the exhaust gas sufficient to achieve the minimum required molar flow rate of methane, or if (2) the actual molar flow rate is equal to or greater than the minimum required molar flow rate, then the exhaust gas is passed through a reactor containing the catalyst to reduce the nitrogen oxides with methane in the presence of oxygen. The control steps are repeated continuously during operation of the methane-fueled internal combustion engine.

The additional flow of methane preferably is provided by a portion of the methane-containing fuel. The required molar ratio of methane to nitrogen oxides in said exhaust gas typically is greater than 0.1.

The internal combustion engine is a spark-ignition engine which operates on fuel selected from the group consisting of methane; natural gas; synthesis gas comprising methane, carbon monoxide, and hydrogen; low purity methane comprising methane and carbon dioxide; and a mixture comprising methane and hydrogen. Alternatively, the internal combustion engine is a diesel (compression-ignition) engine which operates on a fuel consisting essentially of methane or which operates in a dual fuel mode on methane and conventional liquid diesel fuel.

The resulting treated exhaust gas from the reactor can be passed through an oxidation catalyst comprising a platinum or palladium catalyst on an inert support to convert residual methane-containing fuel into carbon dioxide and water. Air is added to said treated exhaust prior to said oxidation catalyst if required. Alternatively, the oxidation catalyst comprises palladium and ZSM-5 zeolite.

The nitrogen oxide reduction catalyst preferably comprises a crystalline zeolite having a silicon to aluminum ratio of equal to or greater than about 2.5 which is prepared by ion exchange of a non-acid sodium or ammonium form of crystalline zeolite with one or more cations selected from the group consisting of cobalt, nickel, iron, chromium, and manganese. The zeolite is exchanged with from 0.1 to about 15 wt % of the cation based on the total weight of the exchanged zeolite, and the zeolite comprises a MOR, MFI, MEL, Beta, or FER structure type zeolite.

An important characteristic of the present invention is that nitrogen oxides can be removed from the exhaust of engines which operate in the fuel-lean region without the need for selective catalytic reduction (SCR) using ammonia. The invention also can be used to treat exhaust from engines which operate at near-stoichiometric air-fuel ratios. A further feature of the invention is that CO is oxidized to $CO_2$ simultaneously as the nitrogen oxides are reduced by the reaction with methane and oxygen in the presence of the specified catalysts.

DETAILED DESCRIPTION OF THE INVENTION

Figure 1:
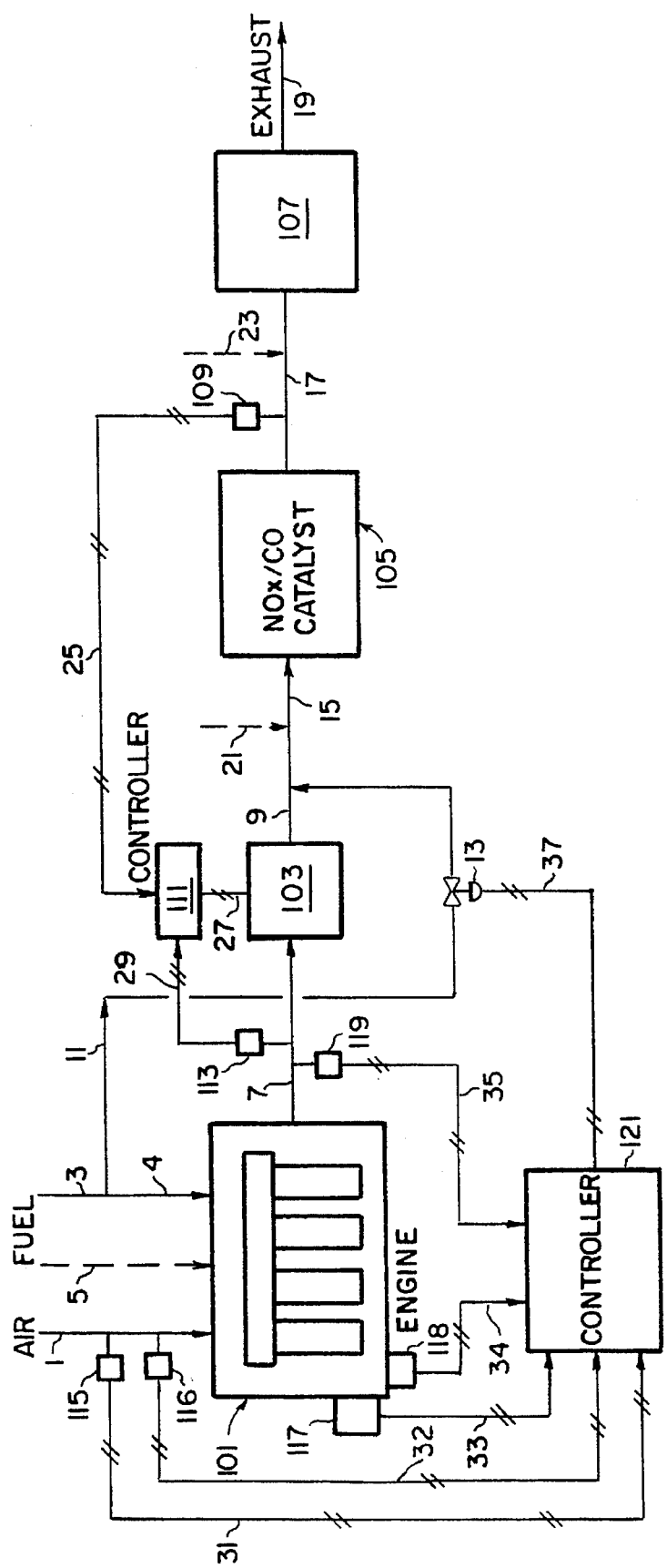
FIG. 1 is a schematic flow diagram of the emission control system used with the method of the present invention.

The present invention is directed to the reduction of nitrogen oxides in the exhaust of methane-fueled internal combustion engines. These nitrogen oxides include one or more of the following components: NO (nitric oxide), $N_2O$ (nitrous oxide), $NO_2$ (nitrogen dioxide), and other oxides formed in the combustion process in these engines. The major species in engine exhaust are nitric oxide and nitrogen dioxide, but small amounts of other nitrogen oxides may be present. All nitrogen oxides are reduced to at least some extent by the method of the present invention. The invention is also directed towards the removal of carbon monoxide simultaneously with the reduction of nitrogen oxides.

According to the invention, nitrogen oxides and methane in the exhaust react with oxygen also present in the exhaust to reduce nitrogen oxides by contact with an appropriate reduction catalyst. Preferably, the catalyst is based on metal-exchanged zeolites having MOR, MFI, MEL, Beta, or FER structures. Oxygen in the engine exhaust gas from a lean-burn engine is generally present in sufficient amounts for the reaction, while in engines operating at near-stoichiometric air/fuel ratios additional oxygen may be needed for the reaction. Methane is present in the engine exhaust in sufficient amounts under certain engine operating conditions; at other operating conditions, supplemental methane must be added in controlled amounts to the exhaust prior to the reactor system. The invention is a method for controlling the addition of methane to the exhaust as required to achieve a desired degree of nitrogen oxides reduction in the exhaust gas. The optimum reactor temperature ranges from 400° to about 600° C. depending upon the particular catalyst used as described below.

The method of the present invention can be used for the treatment of exhaust gas from several types of methane-burning internal combustion engines which operate in spark-ignition or compression-ignition (diesel) cycles. These engines burn high purity methane or natural gas; synthesis gas comprising methane, carbon monoxide, and hydrogen; low purity methane comprising methane and carbon dioxide; and mixtures comprising methane and hydrogen. Any methane-containing fuel can be utilized as long as sufficient methane is available in the fuel to supply the methane requirements for the reduction of nitrogen oxides in the presence of the catalysts of the present invention. Exhaust from dual-fuel diesel engines which operate on methane supplemented with small amounts of hydrocarbon distillate (diesel fuel) also can be treated by the method of the present invention. Because the method of the present invention removes both nitrogen oxides and CO simultaneously and requires only methane as an additional reactant, it is particularly well-suited for treating exhaust from lean-burn engines of either the diesel or spark-ignition types, thereby providing an attractive alternative to the well-known selective catalytic reduction (SCR) process using ammonia as the reductant.

The process of the present invention comprises contacting the engine exhaust containing nitrogen oxides, CO, and oxygen with a required amount of methane in the presence of a catalyst capable of reducing the nitrogen oxides to the required degree. Preferably, the catalyst utilized with the method of the present invention is a metal-exchanged natural or synthetic crystalline zeolite having a silicon to aluminum ratio of greater than or equal to about 2.5 under combustion conditions sufficient to convert nitrogen oxides to gaseous nitrogen, water and carbon oxides. The zeolite can be used either in the alkali metal form, e.g., the sodium or potassium form, the ammonium form, the hydrogen form, or another univalent or multivalent cationic form, to the extent that such zeolites are capable of being exchanged with the metals discussed herein. While catalysts having a Si/Al ratio less than 2.5 prior to treatment appear to demonstrate only limited activity, such catalysts may be activated by subjecting the catalyst to dealumination according to methods well known in the art.

Zeolites having MOR, MFI, MEL, Beta, and FER structures can be used to prepare the exchanged catalysts of the present invention. Representative zeolites under the MOR designation include mordenite, Na-D, Ptilolite and Zeolon. Representative zeolites under the MFI designation include ZSM-5, Silicalite-1, Silicalite, Zeta-1, Zeta-3 and AZ-1. Representative zeolites under the FER designation include ferrierite, SR-D, Fu-9, NU-23 and ZSM-35.

Typically, the pore size of the base zeolite will range from about 5 to 15 angstroms although such a range is not to be construed as limiting the scope of this invention. The sodium form of ZSM-5 can be prepared by the procedures disclosed in U.S. Pat. No. 3,702,886, I & EC 24, 507 (1985) and Shiralkar, et. al., A. Zeolite, 9, 363, (1989), the disclosures which are specifically incorporated by reference herein.

LZ-M-5 zeolite, a synthetic material residing in the non-acid, sodium cation form and an example of a MOR structure type zeolite, is commercially available from Union Carbide Corporation, Chickasaw, Ala. LZM-5 has the following chemical composition (wt % anhydrous)

| | |
|---|---|
| $SiO_2$ | 78.7 |
| $Al_2O_3$ | 12.5 |
| $Na_2O$ | 7.33 |
| $SiO_2/Al_2O_3$ (molar ratio) | 10.7 |
| $Na_2O/Al_2O_3$ (molar ratio) | 0.96 |

The term, mordenite, is meant to include those synthetic and naturally occurring zeolites having the mordenite topology as included under the general IUPAC structural code of mordenite (MOR). While naturally occurring mordenites vary widely in purity, the synthetic zeolites tend to have higher purity and controlled pore structure thereby rendering the synthetic mordenites preferable for catalytic applications.

Mordenite can be synthesized from a wide variety of starting materials of both chemical and natural origins. Synthetic mordenites are typically produced with Si/Al ratios ranging from 5 to about 12.5. Mordenite is a porous crystalline catalyst having a rigid three-dimensional anionic network with intracrystalline channels whose narrowest cross-section has essentially a uniform diameter. Mordenite is distinguished over crystalline alumino-silicate clays such as bentonite which have a two-dimensional layered structure and over alumino-silicates which are amorphous.

The original alkali metal cations of the zeolites according to this invention are preferably replaced in accordance with techniques well known in the art such as ion-exchange, acid-base and solid state reactions. The preferred form of zeolite to be used for ion exchange is the non-acid form, for example the sodium, potassium, or ammonium form of crystalline zeolite. For example, the alkali metal cations of the zeolite can be replaced, at least in part, by ion-exchange with from about 0.1 wt % to about 15 wt % (based upon the total weight of the catalyst) of one or more cations selected from gallium, niobium, cobalt, nickel, iron, chromium, chromium, rhodium and manganese. The most preferred level of exchange corresponds to complete exchange of available cations within the zeolite. Alternatively, ion exchange can be effected by solid state or vapor phase whereby the $H^+$ form of the zeolite is reacted with a metal halide salt (MX) or a metal oxide to liberate HX or water and to place the subject metal into the exchange site. A preferred exchange solution is cobalt(II) acetate.

In a preferred embodiment, the zeolites of this invention can be exchanged with a precious metal selected from the group consisting of platinum, palladium, ruthenium, rhodium and iridium. A suitable metal-exchange technique comprises contacting the zeolite with a solution which contains the salt of the desired replacing cation or cations. Examples of suitable salts include the halides such as chlorides, nitrates, carboxylates and sulfates.

In an alternate embodiment the metal-exchanged zeolite catalysts can be subjected to further metal-exchange treatments to exchange sites on the catalyst with additional cations. Such additional cations include those metals represented by the third period transition metals and members of Groups 8, 9 and 10 of the Periodic Table of the Elements as defined by the notation presented in Pure & Appl. Chem., 60, 3, pp. 431–436 (1988). Preferred cations include cobalt, nickel, iron, manganese and silver. The amount of second metal to be exchanged ranges from about 0.01 wt % to about 2 wt % based upon the total weight of the catalyst with the remaining portion of the exchanged metal comprising cobalt.

In another alternate embodiment, the metal-exchanged zeolites of the present invention are impregnated with various anionic and neutral species. Suitable species may be selected from oxidizing metals or their oxides formed from metals selected from Group 5, 6, 7 and 11 of the Periodic Table of the Elements as defined by the notation presented in Pure & Appl. Chem., 60, 3, pp. 431–436 (1988). The term, oxidizing metal, refers to a metal which is capable of catalyzing oxidation reactions and which affords enhanced catalytic activity when impregnated onto the metal-exchanged zeolites of the present invention. Preferred species include silver and oxides of niobium, molybdenum, vanadium and manganese. The amount of metal to be impregnated onto the metal-exchanged zeolite catalyst is that amount which is sufficient to achieve the desired selectivity and conversion of nitrogen oxides and carbon monoxide to the reduction products.

Generally, the amount of metal moiety impregnated onto the metal-exchanged zeolite catalyst ranges from about 0.01 to 15 wt %, and preferably between about 0.1 to 8 wt % based upon the total weight of the impregnated metal-exchanged zeolite catalyst. However, the level of impregnation should not be such that substantially all of the pores on the zeolite catalyst become clogged thereby rendering the catalyst inactive for the subject process.

In another alternate embodiment, the exchanged zeolites are further impregnated with alumina or gallia. It was discovered that a small amount of alumina or gallia impregnated onto the subject metal-exchanged catalysts provides a substantial improvement in catalyst activity. In fact, the minimum amount of alumina or gallia required to provided the desired result is difficult to ascertain because minute amounts of alumina or gallia provide the desired improvement. The maximum amount of alumina or gallia to be impregnated onto the catalyst is that amount which begins to adversely affect catalyst performance. General amounts of alumina or gallia to be used range frown 0.1 to 40% based upon the total weight of the exchanged zeolite.

The metal-exchanged and impregnated metal-exchanged catalysts of this invention may be subjected to thermal treatment prior to use in the process although such treatment is not required to practice the invention. The thermal treatment may be conducted in the reactor prior to contacting the reactants with the catalyst or as a separate step, and comprises heating the catalysts of this invention to above ambient temperature, preferably between about 80° and 150° C. while under an inert atmosphere of about 1 to 220 atmospheres for a period ranging from about 0.5 to 12 hours to remove residual moisture. The catalyst may be dried during one or more periods utilizing one or more discrete temperatures or temperature ramping techniques known in the art. The amount of time and temperature regime employed to dry the catalyst is not critical to the invention.

The amount of catalyst to be utilized in the present process varies depending upon the reaction conditions (i.e., temperature, pressure and the like), and the type and distribution of components comprising the nitrogen oxides. An effective amount of catalyst is used, i.e., that amount which causes a reaction involving the oxygen, methane and nitrogen oxides to selectively produce the desired reduction products.

The preferred catalysts can be fabricated onto ceramic or metal supports known in the art, preferably those customarily used in the automotive industry. The support may be a monolithic or honeycomb design whereby a ceramic support is extruded to maximize surface area upon which the catalytic material is deposited. Alternatively, pelleted catalysts may be used. The catalysts can be used as components in catalytic converters such as conventional three-way catalytic converters. The catalysts also can be used in conjunction with conventional platinum group metal catalysts which are used to reduce residual methane present in the combustion product following removal of nitrogen oxides and/or carbon monoxide.

Combustion products containing nitrogen oxides and carbon monoxide can be catalytically reacted in the presence of the subject catalysts under a broad range of conditions. Typically, the reaction is operated at temperatures ranging from about 250° C. to 800° C. and pressures between about 0.5 and 300 atmospheres. More particularly, the process can be advantageously run under fixed bed conditions at temperatures ranging from about 400° C. to 600° C. and a gas hourly space velocity ranging from 1,000 to 100,000 $hr^{-1}$, preferably 7,500 $hr^{-1}$ to 30,000 $hr^{-1}$.

The amount of methane added to the nitrogen oxide-containing exhaust gas is important in achieving satisfactory nitrogen oxide reduction. While nitrogen oxide reduction is obtained by using a stoichiometric equivalent or less of methane with respect to nitrogen oxides, a stoichiometric excess of methane is preferred to ensure high removals of nitrogen oxides and carbon monoxide from the combustion product. Generally, the methane/nitrogen oxides ratio (by volume) is greater than about 0.1, although preferably, the methane/nitrogen oxides ratio is maintained between about 0.1 and 800 and most preferably, between 0.1 and 400.

The amount of oxygen required in the nitrogen oxide-containing exhaust gas is not critical to the use of this catalyst in the method of the present invention. Amounts substantially below stoichiometric amounts have been found sufficient to effect the present process although a stoichiometric excess with respect to nitrogen oxides is preferred to ensure complete removal of nitrogen oxides from the effluent stream. For lean-burn engines sufficient excess oxygen will be available in the exhaust. For engines operating at or near stoichiometric air/fuel ratios, sufficient oxygen may be present in the exhaust, but under certain fuel-rich conditions additional oxygen (via air addition) will be required upstream of the catalyst. The oxygen/nitrogen oxides ratio should be at least 0.1 at the feed to the catalyst bed. There should be some excess oxygen over and above the stoichiometric amount at this point.

In order to remove unreacted methane (and other unburned hydrocarbons or carbon monoxide if present) in the treated exhaust gas from the reactor containing one or more of the above-mentioned catalysts, a second stage reactor can be utilized which contains one or more catalysts specifically selected to destroy unburned methane and other unburned hydrocarbons. Such catalysts include platinum and palladium based catalysts such as palladium on ZSM-5. Thus nitrogen oxides and carbon monoxide are destroyed in the first stage of a dual catalyst system and residual methane is destroyed in the second stage prior to exhaust discharge to the atmosphere.

The operation of methane-fueled internal combustion engines under differing load conditions produce exhaust gases which vary considerably in temperature, flow rate, and concentrations of nitrogen oxides, CO, and methane. Temperature, nitrogen oxide concentration, and methane concentration are major variables which affect the performance of the catalyst used to reduce nitrogen oxides; the optimum control of these variables over the complete range of engine operating conditions is the key feature of the present invention. Under low engine load conditions, the exhaust gas typically contains lower concentrations of nitrogen oxides, higher concentrations of unburned methane, and is at a lower temperature. Conversely, at high load conditions, the exhaust typically contains higher nitrogen oxide concentrations, lower unburned methane concentrations, and is at a higher temperature. Therefore, at low load conditions the exhaust gas may require supplemental heating prior to the catalytic reactor, but probably requires little or no added methane, while at high load conditions the exhaust may require cooling and probably requires added methane to achieve the desired level of nitrogen oxide removal. Certain engine designs may yield a different relationship between engine load and concentrations of nitrogen oxides and methane, but the exhaust temperature will increase with engine load as described above. These operating characteristics are presented more fully in the Examples and accompanying discussion given below.

A schematic flow diagram of an engine and catalyst system of the present invention is given in FIG. 1. Engine 101 represents an internal combustion engine of any type including spark ignition, compression ignition (diesel), and hot tube or glow plug ignition engines. The engine configuration can be selected from two-stroke or four-stroke piston engines or rotary engines. Intake air 1 and main gaseous methane-containing fuel 3 are introduced into the engine by known methods, which typically include control of air/fuel ratios within prescribed limits. Auxiliary fuel 5 may be used, for example as pilot fuel in a dual-fuel diesel engine in which both fuels are used simultaneously, or in dual-fuel type of gasoline/compressed natural gas engine which operates on either fuel depending on operating conditions.

Engine exhaust 7 flows through temperature control system 103 in which the exhaust is heated or cooled as necessary to provide the optimum temperature for nitrogen oxide/CO catalyst system 105. When exhaust 9 contains insufficient methane to satisfy the requirements of catalyst system 105, a portion 11 of methane-containing fuel 3 is withdrawn through control valve 13 and added to exhaust 9 to yield reactor feed 15. Alternatively, methane 11 can be added to stream 7 prior to temperature control system 103. Reactor feed 15, now at the optimum temperature and containing the required amount of methane and oxygen for the catalyst being used, passes through system 105 in which the nitrogen oxides and CO react with the oxygen and methane present to yield the desired conversion of nitrogen oxides and CO to nitrogen, $CO_2$, and water. System 105 contains any catalyst capable of reducing nitrogen oxides in the presence of methane and oxygen; preferably the catalyst is based on metal-exchanged zeolites having MOR, MFI, MEL, Beta, or FER structures as described above. Reactor effluent 17 most likely will contain unreacted methane (and may contain other unburned hydrocarbons), since an excess of methane is generally used in feed 15 to catalyst system 105, and the residual excess methane (and other hydrocarbons if present) is oxidized as necessary by oxidation catalyst 107 as described above to yield final clean exhaust 19 which is discharged to the atmosphere. Auxiliary air 21 and/or 23 may be required to provide sufficient oxygen for nitrogen oxide/CO catalyst 105 and methane oxidation catalyst 107, although sufficient oxygen is normally present in the exhaust from lean-burn engines.

Figure 2:
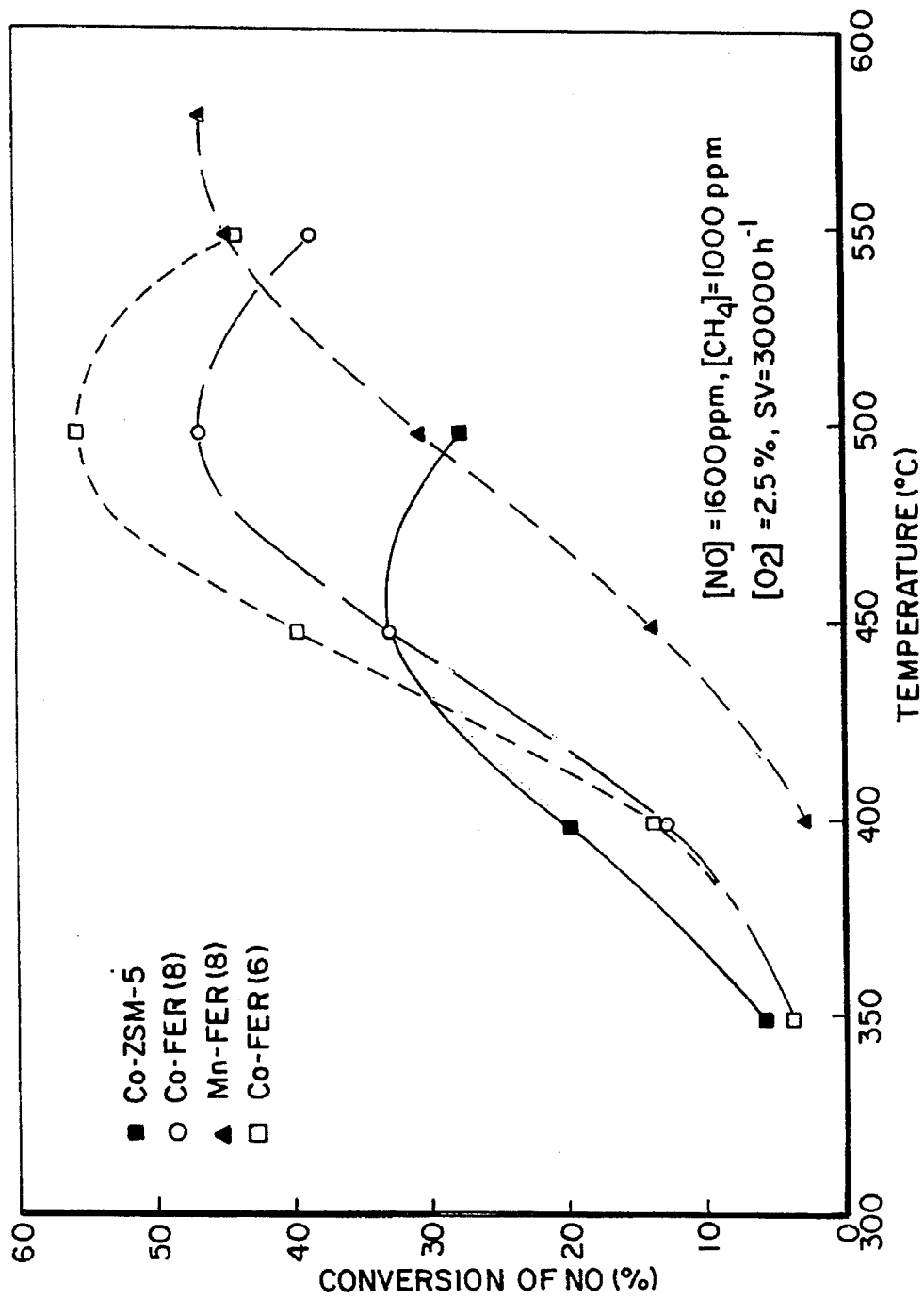
FIG. 2 is a plot of NO conversion vs temperature for four catalysts useful with the method of the present invention.

The key features of the present invention are the control of the temperature and the methane content of exhaust feed 15 to catalyst system 105. Proper control of these parameters is required to achieve the required removal of nitrogen oxides and CO to meet emissions regulations using the methods described herein. Each of the preferred catalysts described earlier has a specific temperature range in which nitrogen oxide conversion is maximized. For example, the best performance of the Co-FER(6) and Co-FER(8) catalysts at a given catalyst space velocity and feed composition occurs at about 500° C., while for Mn-FER(8) this occurs at about 575° C. as illustrated in FIG. 2. The near-complete conversion of CO occurs rapidly at these temperatures, and generally CO conversion is not a limiting factor in setting the design parameters of catalyst system 105. The temperature of exhaust 7 directly from engine 101 will vary widely depending upon engine operating conditions; at prolonged idle this temperature is typically below about 400° C., while at wide open throttle and maximum load this temperature can be as high as 800° C. In addition, the reactions which occur in catalyst system 105 are exothermic, and this can further increase the temperatures therein at high nitrogen oxide and CO conversion rates. Because the optimum temperature range for catalyst 105 and the temperature of exhaust 7 will not necessarily match, particularly for engines which operate at varying loads and speeds, temperature control system 103 will be needed in many applications.

Heating and cooling of exhaust stream 7 may be accomplished by various methods. In one such method, the temperature at the outlet of catalyst 105 is continuously measured by temperature measurement/transmitting device 109 which generates signal 25 representative of this temperature. Signal 25 is utilized by controller 111 in a feedback mode which generates and transmits control signal 27 to control system 103 to heat or cool exhaust 7, thus yielding the desired optimum temperature of exhaust feed 15. This method can include a feedforward component to anticipate sudden increases in exhaust 7 due to sharp changes in engine load, in which the temperature of exhaust 7 is continuously measured by temperature measurement/transmitting device 113 which generates signal 29 representative of this temperature. Signal 29 is utilized by controller 111 in a feed-forward mode, which in conjunction with signal 25 generates and transmits control signal 27 to control system 103. In one method of operation of control system 103, cooling of exhaust 7 is accomplished by diverting a controlled portion of the exhaust through an external air-cooled or liquid-cooled radiator loop (not shown) and combining the cooled portion with the remainder of exhaust 7 to yield exhaust 9 at the desired temperature. Electrical resistance heating can be used if exhaust 7 requires heating. Alternatively, a portion of fuel 3 can be catalytically combusted with air using direct or indirect heat exchange (not shown) with exhaust 7 to yield exhaust 9 at the desired temperature. Other heating and cooling methods can be envisioned by those skilled in the art. For an engine which operates at steady state for extended periods with an exhaust temperature which matches the optimum temperature of catalyst 105, a simpler heating or cooling control system could be used.

The other important feature of the present invention is the proper control of the methane concentration in exhaust 15 to ensure the necessary conversion of nitrogen oxides. Such control is complex because the nitrogen oxide, CO, and unburned methane concentrations in exhaust 7 from a given engine vary with engine load, engine speed, and other operating parameters as earlier discussed. In addition, the molar flow rate of exhaust 7 increases as engine load increases. Further, the characteristic relationship between engine load and the ratio of unburned methane to nitrogen oxides in exhaust 7 is different for each individual engine type and design as discussed below.

One method of controlling methane concentration at the inlet to catalyst 105 at varying engine operating conditions is illustrated in FIG. 1. The mass or volumetric flow rate of inlet air 1 is determined by flow measurement/transmitter device 115 which generates representative signal 31. The manifold absolute pressure (MAP) is measured by pressure measurement/transmitter device 116 which generates representative signal 32. Engine speed is measured by tachometer/transmitter device 117 which generates representative signal 33. The engine throttle position, which is selected to yield a desired power output, is measured by position measurement/transmitter device 118 which generates representative signal 34. Signals 31 through 34 thus represent the primary operating parameters, namely, inlet air mass flow, manifold pressure, engine speed, and throttle position. Other secondary parameters may be useful in characterizing engine operation, such as inlet air ambient temperature, barometric pressure, relative humidity, and fuel composition. These parameters, particularly the primary operating parameters, affect fuel flow and engine operation. Fuel flow and engine operation in turn affect the temperature, flow rate, and the concentrations of nitrogen oxides, methane, and CO of exhaust 7. The concentration of total unburned hydrocarbons in exhaust 7 is determined by total hydrocarbon analyzer 119 to create signal 35 representative of this concentration. For most of the methane-containing fuels described earlier, the unburned hydrocarbons will comprise chiefly methane. If the fuel contains heavier hydrocarbons, unburned portions of these hydrocarbons will be present in the exhaust. The methane fraction of unburned hydrocarbons will be a specific characteristic of the engine and can be determined as a function of the engine operating parameters defined above. Thus signal 35 is proportional to the concentration of methane present in the engine exhaust.

Signals 31, 32, 33, 34, and 35, which are representative of the engine operating conditions, are transmitted to controller 121 which is programmed to determine the molar flow rate additional methane 11 required (if any) in exhaust 15 for the desired nitrogen oxide conversion at the optimum catalyst temperature in catalyst system 105. Depending on operating conditions, one or more of these signals are used as control inputs with the control algorithms of controller 121. The programming of controller 121 would include stored operating information for the specific engine 101 which correlates nitrogen oxide exhaust concentration with the operating parameters measured by sensors 115 through 119. In addition, the controller program should include the methane/nitrogen oxide ratios required with the specific catalyst and temperature to yield required nitrogen oxide conversion levels. The measured parameters are utilized in conjunction with this stored operating information by controller 121 to determine the required flow rate of methane addition at the optimum temperature of catalyst 105. This optimum temperature is selected for the specific catalyst used in 105 and is controlled by temperature control system 103 as discussed earlier. Controller 121 generates control signal 37 which operates control valve 13 to add the proper molar flow of methane; under certain operating conditions, this flow rate may be zero.

Alternatively, sensor 119 can be an online analyzer which determines actual nitrogen oxide and methane concentrations in exhaust 7 which are transmitted to controller 121 as signal 35. Such an analyzer would be particularly well-suited for use in a stationary engine installation. Operating information for engine 101 which correlates the molar flow of exhaust 7 with engine load and speed is stored in controller 121. This information is used with one or more of the representative signals 31 through 35 to generate control signal 37 which is proportional to the required methane addition rate. Alternatively, if engine 101 is operated at near stoichiometric conditions, sensor 119 can be a conventional oxygen sensor whose output can be correlated with engine operating parameters to store predictive exhaust concentration information in controller 121. This information is then utilized with the output from one or more of the operating sensors 115, 116, and 117 and oxygen sensor 119 to generate signal 37 which is proportional to the required methane addition rate controlled by valve 13.

Controllers 111 and 121 can be separate controllers or alternatively their control functions can be integrated with a conventional computer control system which controls engine functions such as air/fuel ratio, ignition timing, fuel injection rate, and other functions. Some or all of the parameters required for nitrogen oxide control as described above, e.g., inlet air flow, engine speed, manifold pressure, and throttle position, may also be used for the engine control functions.

Figure 3:
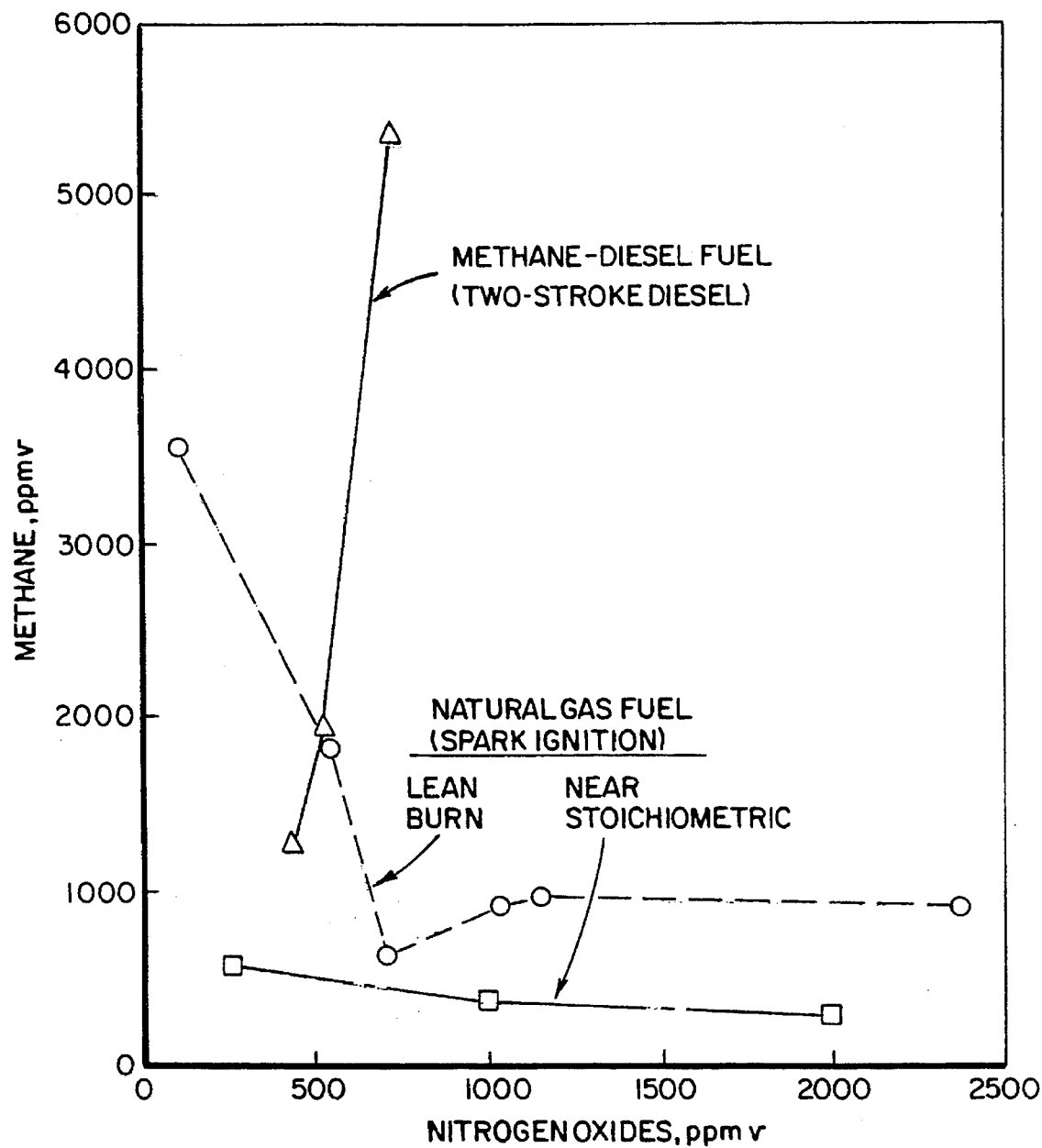
FIG. 3 is a plot of methane vs nitrogen oxide concentration in the exhaust from methane-fueled internal combustion engines.

The relationship between nitrogen oxides and methane in the exhaust of three different methane fueled engines is presented in FIG. 3. For the two natural gas fueled engines, the lowest levels of nitrogen oxides correspond to low engine load conditions, and have the highest methane concentrations. The methane-diesel dual fuel engine has different nitrogen oxide/methane characteristics which are not predictable from the characteristics of the spark-ignition engines. The important point illustrated by FIG. 3 is that methane and nitrogen oxide exhaust concentrations and the variability of these concentrations with engine load are distinctly different for different types of engines. The method of the present invention allows the control of nitrogen oxides in the exhaust of such different engines over varying operating conditions.

EXAMPLE 1

Preparation of Metal-Exchanged Mordenite Zeolite

The metal-exchanged mordenite catalysts of the present invention are prepared according to the following general procedure. By way of example, Co-LZ-M-5 was prepared by submersing fifteen grams of LZ-M-5, obtained from Union Carbide Company, Chickasaw, Ala., in a 2 liter Co(II) acetate solution (0.02M) with stirring at 80° C. for 24 hours. The resulting cobalt exchanged catalyst was washed with 2 liters of distilled water for 1 hour and filtered followed by drying at 110° C. overnight.

EXAMPLE 2

Preparation of Metal-Exchanged MFI Structure Type Zeolites

The metal-exchanged MFI structure type catalysts of the present invention were prepared according to the following general procedure. For example, ZSM-5 was prepared according to the general procedure described in I & EC 24, 507 (1985) wherein a gel was prepared containing 30% silica solution, sodium hydroxide and aluminum hydroxide in the molar ratio of 3.9 $Na_2O$/36 $SiO_2$/$Al_2O_3$/720 water. The resulting gel was stirred at 165° C. in a PARR mini-reactor, filtered and washed with de-ionized water. The composition was verified by X-ray diffraction and elemental analysis. Fifteen grams of the resulting Na-ZSM-5, (Si/Al= 14) were submersed in a 3.5 liter Co(II)acetate solution (0.01M) with stirring at room temperature for 18 hours followed by stirring at 40° C. and 80° C. for 20 and 24 hours, respectively. The resulting cobalt-exchanged catalyst was washed with 3.5 liters of distilled water for 1 hour and filtered followed by drying at 110° C. for 5 hours. Elemental analysis demonstrated that the catalyst contained 4.0 wt % cobalt with a Co/Al ratio of 0.70 which corresponds to 140% of the theoretical exchange level.

EXAMPLE 3

Preparation of Metal-Exchanged Co-ZSM-5 Catalyst

The following general procedure can be used to prepare metal exchanged Co-ZSM-5 catalysts. By way of example, Mn-exchanged Co-ZSM-5 catalyst was prepared by submersing five grams of Co-ZSM-5, prepared by the procedure according to Example 2, in 40 ml of a manganese acetate solution (0.01M) with stirring at room temperature overnight (The exchange temperature for preparing copper- and chromium-exchanged Co-ZSM-5 was room temperature while manganese- and nickel-exchange reactions were conducted at 80° C.). The resulting manganese-cobalt-exchanged ZSM-5 catalyst was washed with 2 liters of distilled water for 1 hour and filtered followed by drying at 110° C. for 5 hours.

EXAMPLE 4

Preparation of Metal-Exchanged Ferrierite Catalysts

Ferrierite in the $K^+$ and $Na^+$ form, obtained from TOSOH corporation (Japan) was first converted to the $NH_4^+$ form by exchanging with $NH_4NO_3$. Ferrierite in the $NH_4^+$ form was then exchanged with $Co^{2+}$ to obtain Co-ferrierite. For example, 15 g of ferrierite (in $K^+$, $Na^+$ form) was suspended in 180 ml $NH_4NO_3$ solution ($[NH_4^+]$ =1M) with constant, vigorous stirring. Each exchange was carried out at room temperature overnight and three exchanges were performed. After the final exchange, the preparation was filtered and washed with 1 liter water, filtered again and dried at 110° C. overnight. The elemental analyses of the sample demonstrated that $Na^+$ and $K^+$ cations were completely exchanged out by $NH_4^+$. 10 g of the $NH_4^+$ ferrierite was taken for $Co^{2+}$ exchange. The $NH_4$-ferrierite was suspended in 500 ml water and 4.0 g $Co(C_2O_2H_3)_2$ $4H_2O$ was dissolved in another 500 ml water. The $Co^{2+}$ solution was slowly added into the zeolite slurry while vigorously stirring with a magnetic stirrer. Each exchange was carried out at 80° C. for 24 hours with two exchanges being performed. The resulting preparation was washed with 1 liter water and dried at 110° C. overnight. Analytical analysis confirmed that 74% cobalt was exchanged. Mn-ferrierite was made by the same procedure except that the $Mn^{2+}$ exchange was carried out three times.

EXAMPLE 5

Preparation of Pd-ZSM-5 Catalyst

The subject catalyst was prepared according to the following general procedure. 20 grams of $Pd(NO_3)_2$ solution (1.44 wt % Pd) containing $2.72 \times 10^{-3}$ moles Pd, which is equivalent to the base exchange capacity of 5 g of Na-ZSM-5, was prepared. $Pd^{2+}$ was exchanged in a 500 ml solution $[Pd^{2+}]$=0.005M with 5 g of Na-ZSM-5 for 24 hours. The resulting Pd-ZSM-5 catalyst was filtered and dried at 100° C. overnight. The catalyst contained 3.7% palladium.

EXAMPLE 6

Selective Catalytic Reduction of Nitrogen Oxides with Methane and Oxygen

A reactor was constructed having a 4 mm i.d. glass tube with an expanded section (8–13 mm i.d.) as a catalyst bed. A separate inlet for admixing oxygen with the NO was provided at a position to enable thorough mixing just prior to contacting the reactants with the desired catalyst. The weight of catalyst used in these tests varied from a few tenths of a gram to one gram. The GHSV can be varied between 100 and 100,000 to achieve desired conversion levels. The reactor was surrounded by a temperature-controlled furnace. The temperature was monitored by a chromel-alumel thermocouple which was in contact with the catalyst bed.

The activity measurements were made with a microcatalytic reactor in a steady-state flow mode. Product analysis was obtained using an on-line gas chromatograph with a thermal conductivity detector. The separation column was packed with 5A molecular sieve (80/100 mesh) and was 4 feet long having a ⅛" outer diameter. Chromatograph temperature was 25° C. and the flow rate of the carrier gas was 30 $cm^3$/min.

The reactor was packed with the Co-ZSM-5 catalyst of Example 2 and a feed mixture containing 820 ppmv NO, 1015 ppmv $CH_4$, and 25,000 ppmv $O_2$ in helium was passed therethrough at 400° C. and a reactor space velocity (GHSV) of 30,000 $h^{-1}$. The resulting NO and $CH_4$ outlet concentrations and conversions are given in Table 1. The experiment was repeated with 1025 ppmv of CO added to the feed mixture and the resulting CO, NO, and $CH_4$ outlet concentrations and conversions are given in Table 2. These results confirm the conversion of NO in the absence of CO, and also confirm that the Co-ZSM-5 catalyst is bifunctional and effects the simultaneous reduction of NO with methane and the oxidation of CO to carbon dioxide.

TABLE 1

NO REDUCTION OVER Co-ZSM-5[a] USING METHANE AS REDUCTANT IN THE ABSENCE OF CO

| Species | Inlet Concentration (ppm) | Outlet Concentration (ppm) | Conversion (%) |
|---|---|---|---|
| NO | 820 | — | 33 |
| $CH_4$ | 1015 | 771 | 24 |
| CO | 0 | 0 | N/A |
| $CO_2$ | 0 | 223 | N/A |
| $O_2$ | 25,000 | — | — |

[a]Reaction run at 400° C. at GHSV = 30,000 $h^{-1}$
N/A Not applicable — not measured

TABLE 2

NO REDUCTION OVER Co-ZSM-5[a] USING METHANE AS REDUCTANT IN THE PRESENCE OF CO

| Species | Inlet Concentration (ppm) | Outlet Concentration (ppm) | Conversion (%) |
|---|---|---|---|
| NO | 820 | — | 36 |
| $CH_4$ | 1015 | 782 | 24 |
| CO | 1025 | 0 | 100 |
| $CO_2$ | 0 | 1270 | N/A |
| $O_2$ | 25,000 | — | — |

[a]Reaction run at 400° C. at GHSV = 30,000 $h^{-1}$
N/A Not applicable — not measured

EXAMPLE 7

The reactor and procedures of Example 6 were utilized at three different temperatures to compare the conversion of NO and methane (1) over a single Co-ZSM-5 catalyst bed and (2) over a dual catalyst bed containing Co-ZSM-5 in a first layer and the Pd-ZSM-5 catalyst of Example 5 in a second layer. The results are summarized in Table 3 which illustrates the relationship between NO conversion and methane utilization over the first catalyst, and confirms the complete oxidation of the residual methane over the second catalyst.

TABLE 3

COMPARISON OF RESULTS USING A SINGLE BED[a] and DUAL BED[b] CATALYSTS

| Run | Temp. (°C.) | Single Bed Conversion NO (%) | Conversion $CH_4$ (%) | Dual Bed Conversion NO (%) | Conversion $CH_4$ (%) |
|---|---|---|---|---|---|
| 68 | 350 | 10 | 6 | 10 | 100 |
| 69 | 400 | 23 | 26 | 23 | 100 |
| 70 | 450 | 34 | 64 | 34 | 100 |

TABLE 3-continued

COMPARISON OF RESULTS USING A SINGLE BED[a] and DUAL BED[b] CATALYSTS

| Run | Temp. (°C.) | Single Bed Conversion NO (%) | Conversion $CH_4$ (%) | Dual Bed Conversion NO (%) | Conversion $CH_4$ (%) |
|---|---|---|---|---|---|

[a]Reaction run on a 0.1 g Co-ZSM-5 catalyst with a flow rate of 100 cc/min. and with [NO] = 1600 ppm, [$CH_4$] = 1000 ppm and [$O_2$] = 2.5%
[b]Reaction run on a dual bed sample, 0.1 g Co-ZSM-5 catalyst (first layer) and 0.1 g Pd-ZSM-5 (second layer) with a flow rate of 100 cc/min. and with [NO] = 1600 ppm, [CO] = 1000 ppm and [$O_2$] = 2.5%

EXAMPLE 8

Figure 4:
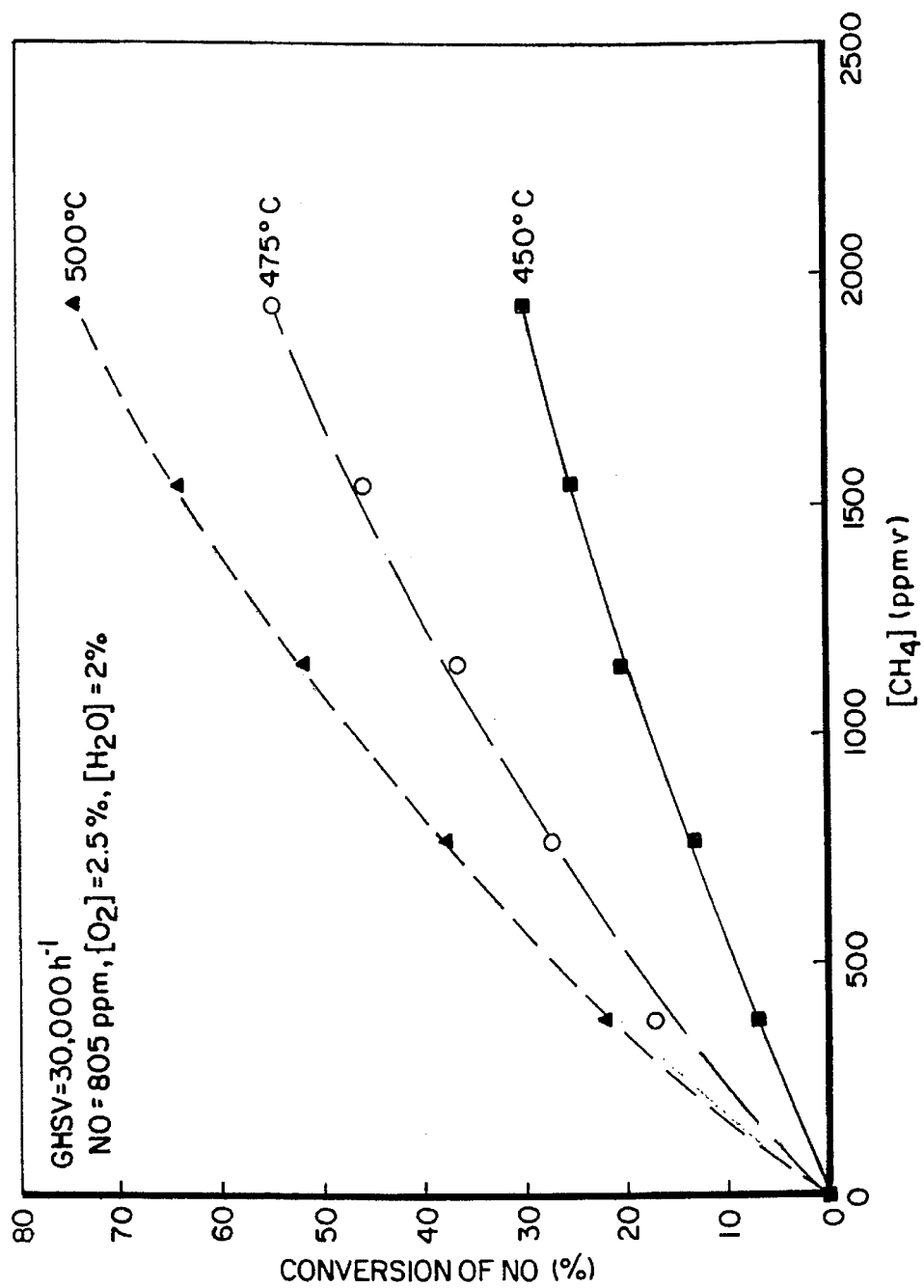
FIG. 4 is a plot of NO conversion vs methane concentration for the catalyst Co-FER(6) in the presence of 2 vol % water.

The reactor and procedures of Example 6 were utilized at three different temperatures to compare the conversion of NO as a function of methane concentration over the Co-FER(6) catalyst of Example 4. The reactor feed contained 805 ppmv NO, 2.5 vol % oxygen, and 2.0 vol % water; methane was added to the feed at concentrations between 400 and 1950 ppmv. The results are given in FIG. 4 at 450°, 475°, and 500° C. and represent data for methane:NO molar ratios between 0.5 and 2.4. FIG. 4 indicates that at a fixed inlet NO concentration, NO conversion is proportional to methane concentration.

EXAMPLE 9

Figure 5:
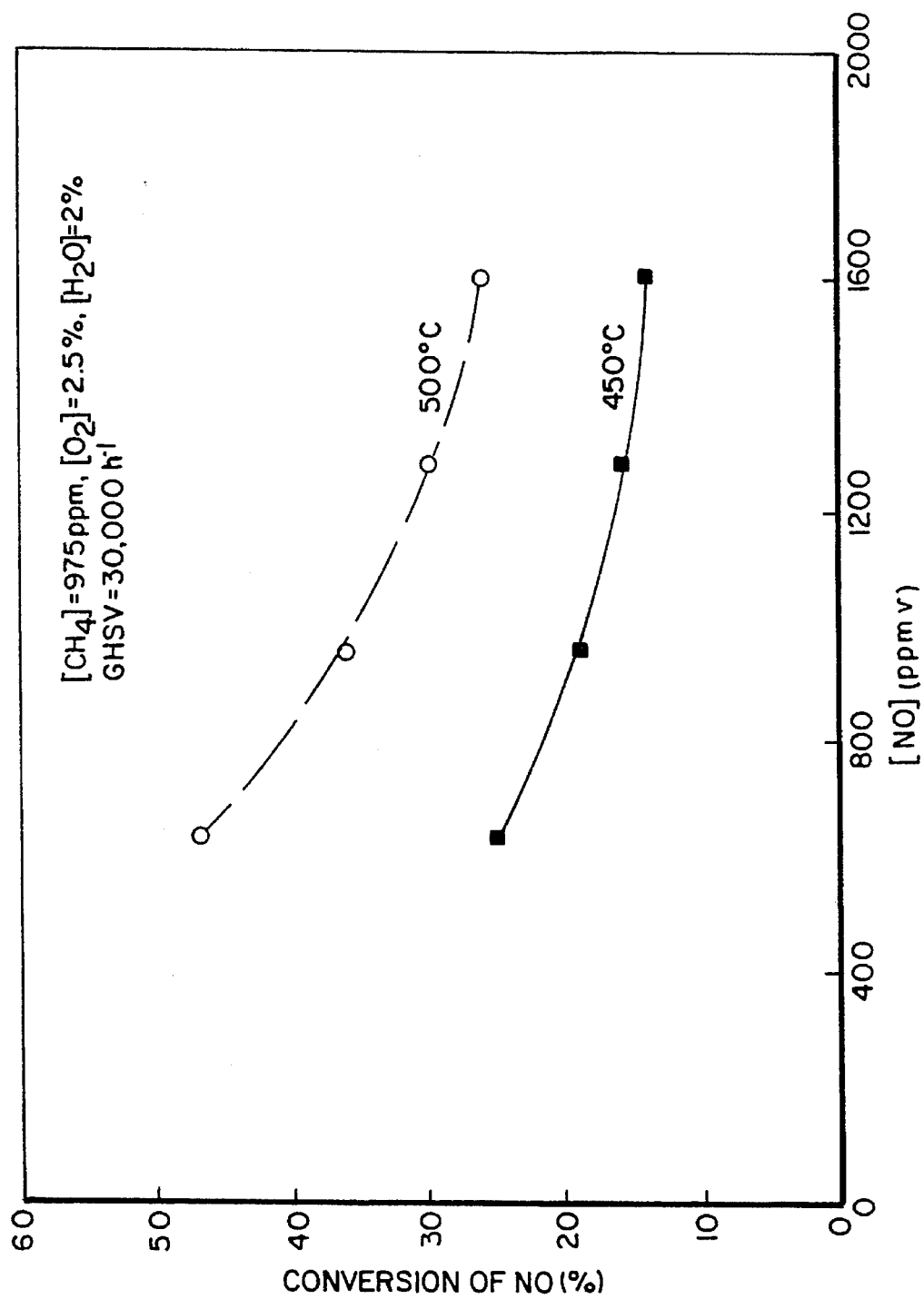
FIG. 5 is a plot of NO conversion vs NO concentration for the catalyst Co-FER(6) in the presence of 2 vol % water.

The reactor, catalyst, and procedures of Example 8 were utilized to compare the conversion of NO as a function of NO concentration over the Co-FER(6) catalyst of Example 4 at 450° and 500° C. The reactor feed contained 975 ppmv methane, 2.5 vol % oxygen, and 2.0 vol % water; the NO concentration was varied between 630 and 1600 ppmv. The results are given in FIG. 5 and represent data for methane:NO molar ratios between 0.61 and 1.55. At a fixed methane concentration, NO conversion decreases with decreasing inlet NO concentration.

EXAMPLE 10

The methane-fueled spark ignition four-stroke engine 101 of FIG. 1 operates at power output of 100 BHP with 10% excess air. The exhaust 7 temperature is 850° F. (454° C.) and the exhaust contains 1000 ppmv CO, 250 ppmv methane, 17,000 ppmv oxygen, and 805 ppmv NO. The exhaust is to be treated by passage through catalyst system 105 at a GHSV of 30,000 $h^{-1}$ which contains the Co-FER(6) catalyst of Example 4. The required NO conversion is 60%. The optimum operating temperature for this catalyst is 500° C. as shown in FIG. 2, thus requiring heating of exhaust 7 from 454° C. by temperature control system 103 to yield exhaust 9 at 500° C. Referring to FIG. 4, the 250 ppmv methane concentration in exhaust 9 will yield a NO conversion of only about 15%, so that additional methane 11 must be added through valve 13 to achieve the required 60% NO conversion in catalyst system 105. From FIG. 4 it is seen that this NO conversion level requires 1400 ppmv of methane, or a methane:NO ratio of 1.68. At 100 BHP, engine 101 consumes about 40 lb/hr of methane, and 250 ppmv methane in exhaust 9 is equivalent to about 0.11 lb/hr. In order to attain 1400 ppmv methane, an additional 0.51 lb/hr of methane must be introduced into exhaust 9 to yield reactor feed 15 at the required methane concentration. This additional methane is only about 1.3% of the total engine fuel consumption.

EXAMPLE 11

The lean-burn natural gas engine of FIG. 3 operates at selected conditions which yield an exhaust containing 1200 ppmv nitrogen oxides as NO and 980 ppmv methane. By utilizing the catalyst and reactor temperature of Example 10, it is seen from FIG. 5 that a 30% NO conversion is possible without the addition of methane to the reactor feed.

The method of the present invention thus allows the catalytic reduction of nitrogen oxides and the simultaneous oxidation of CO in the exhaust of methane-fueled engines by utilizing a portion of the methane from the fuel as a reactant in the presence of a threshold amount of oxygen. By using an oxidation catalyst following the nitrogen oxide/CO catalyst, unreacted methane can be removed to yield a treated exhaust to meet the required emission levels for methane-fueled engines. No external reductant is required for the nitrogen oxide reduction, since the engine fuel provides the methane needed as the reductant. This is an advantage over the widely-used method of nitrogen oxide removal, selective catalytic reduction (SCR) using ammonia as a reducing reactant. The method of the present invention can be applied to any type of internal combustion engine which operates on a methane-containing fuel, and is particularly useful for reducing nitrogen oxides in the exhaust of lean-burn engines which otherwise can be accomplished only by selective catalytic reduction with ammonia.

The essential characteristics of the present invention are described completely in the foregoing disclosure. One skilled in the art can understand the invention and make various modifications thereto without departing from the basic spirit thereof, and without departing from the scope and range of equivalents of the claims which follow.

I claim:

1. A method for controlling the reduction of nitrogen oxides in an exhaust gas from a methane-fueled internal combustion engine, wherein said exhaust gas contains oxygen, methane, and said nitrogen oxides, said method comprising:

(a) selecting a catalyst capable of reducing nitrogen oxides with methane in the presence of oxygen in said exhaust gas;

(b) determining the reaction characteristics of said catalyst including the degree of nitrogen oxide reduction as a function of temperature and as a function of the molar ratio of methane to nitrogen oxides in said exhaust gas;

(c) determining the operating characteristics of said methane-fueled internal combustion engine including the concentration of nitrogen oxides in said exhaust gas and the volumetric flow rate of said exhaust gas as functions of selected operating variables comprising one or more engine variables selected from the group consisting of inlet air mass flow, manifold pressure, engine speed, and throttle position;

(d) selecting a required degree of nitrogen oxides reduction in said exhaust gas, and determining from the information of step (b) a required temperature range and a required molar ratio of methane to nitrogen oxides in said exhaust gas to achieve said required degree of nitrogen oxides reduction;

(e) providing a methane-containing fuel and operating said methane-fueled internal combustion engine utilizing at least a portion of said methane-containing fuel;

(f) controlling the temperature of said exhaust gas within said required temperature range and measuring said one or more engine variables selected from the group consisting of inlet air mass flow, manifold pressure, engine speed, and throttle position;

(g) utilizing values of said one or more engine variables measured in step (f) with said operating characteristics determined in step (c) to predict the molar flow rate of nitrogen oxides in said exhaust gas;

(h) utilizing the molar flow rate of nitrogen oxides determined in step (g) with said required molar ratio of methane to nitrogen oxides in said exhaust gas to determine the minimum required molar flow rate of methane in said exhaust to achieve said required degree of nitrogen oxides reduction;

(i) measuring the concentration of unburned methane in said exhaust gas, determining the actual molar flow rate of said unburned methane, and (1) if said actual molar flow rate of methane is less than said minimum required molar flow rate of methane, introducing an additional flow of methane into said exhaust gas sufficient to achieve said minimum required molar flow rate of methane, or (2) if said actual molar flow rate is equal to or greater than said minimum required molar flow rate, then passing the exhaust gas through a reactor containing said catalyst to reduce said nitrogen oxides with methane in the presence of oxygen in said exhaust gas; and (j) repeating steps (f) through (i) while operating said methane-fueled internal combustion engine according to step (e).

2. The method of claim 1 wherein said additional flow of methane is provided by a portion of said methane-containing fuel.

3. The method of claim 1 wherein said required molar ratio of methane to nitrogen oxides in said exhaust gas is greater than 0.1.

4. The method of claim 1 wherein said internal combustion engine is a spark-ignition engine which operates on fuel selected from the group consisting of methane; natural gas; synthesis gas comprising methane, carbon monoxide, and hydrogen; a mixture containing methane and carbon dioxide; and a mixture consisting essentially of methane and hydrogen.

5. The method of claim 1 wherein said internal combustion engine is a diesel engine which operates on a fuel consisting essentially of methane.

6. The method of claim 1 wherein said internal combustion engine is a diesel engine which operates in a dual fuel mode on methane and diesel fuel.

7. The method of claim 1 which further comprises passing the resulting treated exhaust gas of step (i) over an oxidation catalyst comprising a platinum or palladium catalyst on an inert support to convert residual methane-containing fuel into carbon dioxide and water.

8. The method of claim 7 which further comprises the addition of air to said treated exhaust prior to said oxidation catalyst.

9. The method of claim 1 which further comprises passing the resulting treated exhaust gas of step (i) over an oxidation catalyst comprising palladium and ZSM-5 zeolite to convert residual methane-containing fuel into carbon dioxide and water.

10. The method of claim 1 wherein said required temperature range is between 250° and 800° C.

11. The method of claim 10 wherein the temperature of said exhaust gas is maintained within said required temperature range by heating said exhaust gas prior to said catalyst.

12. The method of claim 10 wherein the temperature of said exhaust gas is maintained within said required temperature range by cooling said exhaust gas prior to said catalyst.

13. The method of claim 1 wherein said catalyst comprises a crystalline zeolite having a silicon to aluminum ratio of equal to or greater than about 2.5 which is prepared by ion exchange of a non-acid sodium or ammonium form of crystalline zeolite with one or more cations selected from the group consisting of cobalt, nickel, iron, chromium, and manganese.

14. The method of claim 13 wherein said zeolite is exchanged with from 0.1 to about 15 wt % of the cation based on the total weight of the exchanged zeolite.

15. The method of claim 14 wherein the zeolite comprises a MOR, MFI, MEL, Beta, or FER structure type zeolite.

16. The method of claim 13 wherein the exchanged zeolite is further exchanged with from 0.01 to about 2 wt %, based upon total weight of the exchanged zeolite, with an additional metal selected from the third period transition metals or Groups 5, 6, 7 and 11 of the Periodic Table of the Elements.

17. The method of claim 13 wherein the metal-exchanged zeolite is impregnated with from 0.01 wt % to 15 wt %, based upon the total weight of the impregnated metal-exchanged zeolite, of an anionic or neutral species containing a metal selected from Group 5, 6, 7 and 11 of the Periodic Table of the Elements.

18. The method of claim 17 wherein the specie to be impregnated onto the metal-exchanged zeolite contains a metal selected from the group consisting of niobium, molybdenum, silver, vanadium and manganese.

19. The method of claim 13 wherein the metal-exchanged zeolite is impregnated with from 0.1 to 23 wt % alumina based upon the total weight of the impregnated metal-exchanged zeolite.

20. The process according to claim 15 wherein the MOR structure type zeolite is selected from the group consisting of mordenite, Na-D, Ptilolite and Zeolon.

21. The process according to claim 15 wherein the MFI structure type zeolite is selected from the group consisting of ZSM-5, Silicalite-1, Silicalite, Zeta-1, Zeta-3 and AZ-1.

22. The process according to claim 15 wherein the FER structure type zeolite is selected from the group consisting of ferrierite, SR-D, Fu-9, NU-23 and ZSM-35.

23. The process according to claim 15 wherein the catalyst is cobalt-exchanged ferrierite.

24. The process according to claim 15 wherein the catalyst is Co-ZSM-5 onto which alumina has been precipitated.

* * * * *